United States Patent [19]

Lang et al.

[11] Patent Number: 4,824,811

[45] Date of Patent: * Apr. 25, 1989

[54] LIGHTWEIGHT CERAMIC MATERIAL FOR BUILDING PURPOSES, PROCESS FOR THE PRODUCTION THEREOF AND THE USE THEREOF

[75] Inventors: Rudiger Lang, Minden; Bernd Meyer, Bremen, both of Fed. Rep. of Germany

[73] Assignee: Effem GmbH, Verden, Fed. Rep. of Germany

[*] Notice: The portion of the term of this patent subsequent to Apr. 25, 2006 has been disclaimed.

[21] Appl. No.: 75,203

[22] Filed: Jul. 17, 1987

Related U.S. Application Data

[63] Continuation of Ser. No. 810,040, Dec. 12, 1985, abandoned.

[30] Foreign Application Priority Data

Apr. 19, 1984 [DE] Fed. Rep. of Germany ....... 3414967

[51] Int. Cl.$^4$ ............................................. C04B 38/00
[52] U.S. Cl. ......................................... 501/84; 252/62
[58] Field of Search ............................. 501/84; 252/62

[56] References Cited

U.S. PATENT DOCUMENTS

| | | | |
|---|---|---|---|
| 1,998,686 | 4/1935 | Parsons | 501/84 X |
| 2,543,987 | 3/1951 | Ramsay | 501/84 OR |
| 4,318,996 | 3/1982 | Magder | 501/84 OR |
| 4,341,561 | 7/1982 | Britt et al. | 501/84 X |
| 4,356,271 | 10/1982 | Francis et al. | 501/84 OR |
| 4,424,280 | 1/1984 | Malric | 501/84 OR |

OTHER PUBLICATIONS

Modde et al., American Ceramic Society Bulletin, vol. 47(3), (Mar. 1968).

Primary Examiner—William R. Dixon, Jr.
Assistant Examiner—Karl Group
Attorney, Agent, or Firm—Curtis, Morris & Safford

[57] ABSTRACT

Lightweight ceramic material for building purposes, particularly for bricks, plates and panels, as well as for using as an aggregate/filler material for lightweight building materials, characterized by a porosity of 50 to 300%, preferably 100 to 250%; a pH-value between 5 and 9, particularly 7 to 8; a bulk density of 300 to 700 g/l; which can be produced by firing a foamed mixture of clay or clays, optionally aggregate or aggregates, anionic or cationic surfactant or surfactants, deflocculant or deflocculants, and optionally a hydraulic binder, such as cement, at temperatures above 600° C., process for the production thereof and the use thereof.

11 Claims, 1 Drawing Sheet

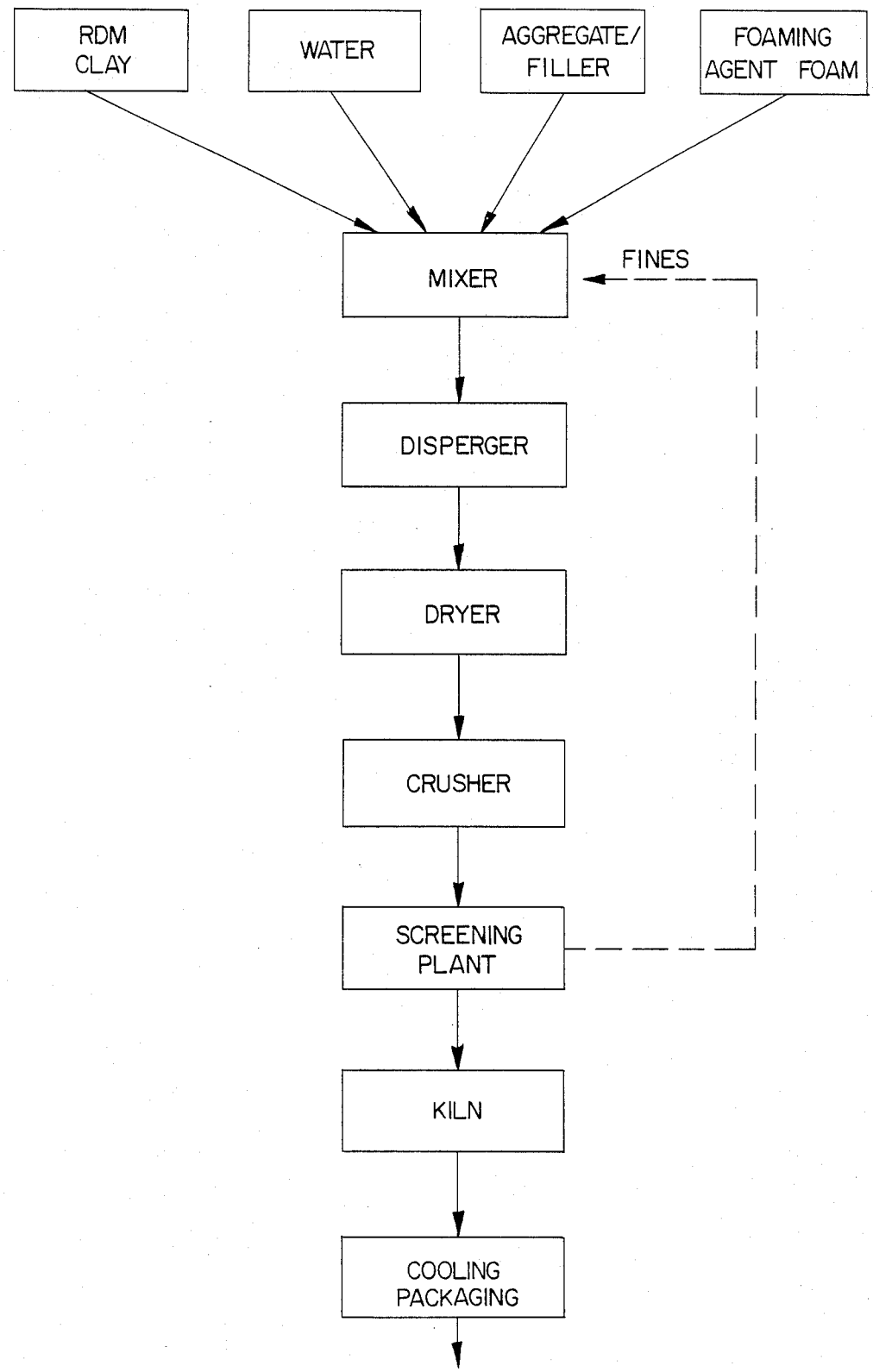

LIGHTWEIGHT CERAMIC MATERIAL FOR BUILDING PURPOSES, PROCESS FOR THE PRODUCTION THEREOF AND THE USE THEREOF

This application is a continuation of application Ser. No. 810,040, filed Dec. 17, 1985 abandoned.

The present invention relates to a lightweight ceramic material for building purposes, particularly for bricks, plates and panels, as well as for inserting as an aggregate/filler in lightweight construction materials, process for the production thereof and the use thereof.

Lightweight building materials based on lime and cement are already known as so-called "cellular concrete" or "foamed concrete". Conventionally mixtures of calcium oxide, silicon dioxide and water are autoclave-hardened, accompanied by the addition of foam, or in the foamed state.

The known porous light building materials such as are e.g. known from European Pat. No. 0 007 585, admittedly have satisfactory strength and other important characteristics for building purposes, such as a low weight, but for many applications they are too expensive.

An object of the present invention is to provide a lightweight, ceramic material of the aforementioned type, which is suitable both as a lightweight aggregate and for producing molded or shaped articles, such as bricks, particularly for thermal and/or sound insulation purposes, as well as for refractory building purposes, and which leads with simple starting materials to pressure-resistant, lightweight shaped articles in an inexpensively realized process.

According to the invention this object is achieved by a lightweight ceramic material of the aforementioned type which is characterized by a porosity of 50 to 300%, preferably 100 to 250%; a pH-value in the range 5 to 9, preferably 7 to 8; a bulk density of 300 to 700 g/liter; which can be produced by firing a foamed mixture of clay or clays, optionally aggregate or aggregates, anionic or cationic surfactant or surfactants, def234243234flocculant or def234243234flocculants, and optionally a hydraulic binder, such as cement, at temperatures above 600° C. and preferably 800° C. and higher.

The inventive process for producing lightweight ceramic materials is characterized by mixing 45 to 80 parts by weight of clay, 0 to 50 parts by weight of additives (such as fillers) 15 to 30 parts by weight of water, and 0.01 to 0.03 parts by weight of def234243234flocculants; producing a foamed mixture accompanied by the addition of surfactants; molding and drying the foamed mixture to give dried molded clay members; and firing the molded clay members at a product temperature therein between 600° and 1400° C. and preferably 800° to 1200° C.

It is particularly advantageous to use as the aggregates calcite, quartz sand, dolomite, feldspar, chamotte, sepiolite and/or organic materials, such as sawdust or coal.

If for manufacturing reasons a product with particularly high strength characteristics is required, which can be the case with production units exceeding the dimensions of bricks, it is possible to add a hydraulic binder such as cement. A particular advantage of the process according to the invention is that it is possible to use as the clay simple brick clay and marl, but also Westerwald stoneware clay, fine stoneware clay, kaolin, montmorillonite or bentonite.

According to the invention, it is particularly economic that the molded articles which do not prove to be satisfactory after drying, or granular clay foam fines obtained during granulate production and separated during the screening process, can be returned directly to the starting mixture without further treatment, because they are only dried and not fired, so that they are still completely reactive.

For the production of the lightweight ceramic material according to the invention, it is possible to foam, demold and dry a mixture of starting materials, whilst adding surfactant in a dispersing plant and under pressure and then to fire the dried product in a kiln. However, it is also possible to add to the mixture of starting substances a prefabricated foam, such as e.g. can be used for foamed concrete production and this material mixture is then allowed to dry and is fired.

Conventionally, the process according to the invention is performed in such a way that the clay is mixed with water and deflocculant, to give a low water content, thixotropic suspension. This suspension can then be prepared with clearly defined finished foam quantities, preferably with a liter weight of 30 to 80 g/liter. Another process by which a foam suspension can be prepared from the clay suspension consists of adding a surfactant to the latter, and foaming takes place in a dispersing plant, accompanied by the addition of compressed air. It is possible to use conventional dispersion plants, such as that marketed under the name "Hansa-Mixer" by the firm Hansa-Mixer, Bremen, which under a pressure of 1 to 10 bar, adds clearly defined compressed air quantities. The dispersing plant has a fine dosing or metering pump, by means of which liquid can be added before and optionally during the foaming process. Advantageously when performing the process according to the invention, a substance counteracting the deflocculating action of the deflocculant is used, e.g. dilute hydrochloric acid, so that it is possible to produce a highly viscous, thixotropic, inherently stable foam suspension.

The inherently stable, thixotropic foam suspension is then dried, it being possible for the water vapor to pass unhindered through the pores as a result of the high inherent porosity. It is particularly advantageous if the starting material mixture has a relatively low water content. Conventionally the dried material is brought into the form of approximately 1 cm diameter strands, it being possible to work with drying times of e.g. no more than 5 minutes at temperatures of 200° C. This dried material is then crushed into granular form prior to firing.

As a result of the material porosity, particularly when firing substances having very small dimensions, a very favorable working, much as when drying, is possible. At a kiln temperature of 1400° C., corresponding to a material temperature between 800° and 1200° C., it is possible within less than 5 minutes of firing time including the heating and cooling times, to produce lightweight ceramic materials for building purposes. Higher temperature treatment is particularly desirable for the inventive use of the material for building purposes, because as a result particularly favorable strength characteristics can be obtained.

The invention also relates to the use of the lightweight building material in solid and/or granular form as a thermal and/or sound insulation material for building purposes, as well as the use of the light weight ceramic building material in solid and/or granular form as an aggregate for high temperature building materials, such as furnace building materials, refractory building materials and the like.

Naturally, the quantity of the remaining aggregates can be appropriately determined, e.g. when producing refractory building materials, the alumina, magnesite, quartz, etc. are added in accordance with the particular application.

Particularly preferred embodiments of the porous material according to the invention and the inventive process can be gathered from the subclaims.

Further features and advantages of the invention can be gathered from the following description of embodiments illustrated by the diagrammatic drawing. The single drawing shows a flow chart for performing the process according to the invention.

Use is made of 45 to 80 parts by weight of clay, 15 to 30 parts by weight of water, optionally with 0 to 50 parts by weight additives, as well as 0.01 to 0.03 parts by weight of deflocculants, optionally with a function-dependent proportion of hydraulic binder, which are mixed together in a conventional mixture. The clay can e.g. be brick clay, Westerwald stoneware clay, fine stoneware clay, kaolin, montmorillonite, bentonite or marl. The aggregates can be constituted by calcite, quartz sand, dolomite, feldspar, chamotte and/or organic materials, such as sawdust or coal. The deflocculants can e.g. be water glass, calcium polyphosphate, sodium polyphosphate, phosphoric acid, chlorides or sulphates. Cement is preferably used as the hydraulic binder for obtaining higher strength characteristics.

The low water content mixture produced from the aforementioned ingredients is mixed with a foam having a liter weight between 30 and 80 g/liter produced in per se known manner by a foam generator, and dried in molds or by means of a molding apparatus. Drying can optionally be accelerated by applying a vacuum or using a drying oven and takes place extremely simply and rapidly as a result of the high porosity of the material to be dried. The dried products are then placed in a kiln at a kiln temperature of 1000° to 1400° C., corresponding to a product temperature between approximately 800° and 1000° C., where firing takes place. When producing lightweight aggregates, as used e.g. for concretes and the like in the building field, granular materials are appropriate, which can be produced in that the dried shaped articles are passed through a crusher to a screening plant, which holds back a preferred particle size range and discards fines, which can then be returned to the mixer, which is apparent from the drawing.

EXAMPLE I 500 kg of marl and 400 kg of crushed, dried foam clay produced by crushing discarded, dried, not yet fired foam clay blanks, 200 lites of water and 120 g of sodium polyphosphate and 100 g of sodium dodecyl sulphonate are placed in a disperser, of the type manufactured by Hansa-Mixer, Bremen, followed by foaming with compressed air at 3 bar, the foamed product is poured into plate molds, passed into a drying oven and dried for 10 minutes at 200° C. The dried foam clay blands are removed from molds and fired for 7 minutes in conventional manner in a standard kiln at a temperature of approximately 1000° C. (product temperature—kiln temperature approximately 1400° C.). Yellow-brown lightweight ceramic plates are obtained, which had a pH-value of 7 to 8, a pore diameter of <1 mm and a bulk density of approximately 0.6 g/cm$^3$.

The advantages of the thus produced product are high thermal insulation action, sound insulation action and limited hygroscopicity. Such plates or shaped bricks can be used as a substitute for fiberglass wool, asbestos fibers, rock wool or styropore for thermal insulation purposes, and also as covering panels and lightweight partitions, if limited bulk density is required due to inadequate loadability of the substrate.

EXAMPLE II 800 kg of kaolin, 200 kg of pumice crushed to a particle size of 1 and 2.5 mm, 200 liters of water and 100 g of 5% phosphoric acid were mixed and thoroughly mixed with 300 g of sodium lauryl sulphonate foam (liters weight 70 g/liter). This was followed by shaping or molding into strand form in the molding or shaping plant. This was followed by crushing to particle sizes with a diameter between 2 and 5 mm in a conventional crushing mill, followed by screening. The fines were separated and all material below a particle size of 2 to 5 mm was discarded, the crushed product was passed into a kiln at a kiln temperature of 1000° C., fired for 5 minutes and then the resulting granular material was cooled and packed. The resulting material, particularly suitable as a lightweight aggregate for e.g. lightweight concretes, gypsum panels and the like had compression strengths, apparent density and thermal conductivity coefficient values, which made it appear particularly suitable for this purpose, the pH-value being 7 to 8 and the bulk density approximately 0.6 g/cm$^3$.

Through the addition of hydraulic binders, such as cement, it is possible to obtain better strength values without loss of the favorable characteristics, namely a lightweight and inexpensive manufacture.

The features of the invention disclosed in the above description, drawing and the claims can be essential to the realization of the invention in its various embodiments, both individually and in random combinations.

We claim:

1. A process for producing a lightweight ceramic material for use in building purposes, as a thermal and/or noise insulating material or as an aggregate for high temperature building materials, furnace building materials and/or refractory building materials, having a bulk density of 300 to 700 g/liter, which comprises forming a starting mixture containing 45 to 80 parts by weight of clay, 0 to 50 parts by weight of an aggregate, 15 to 30 parts by weight of water, 0.01 to 0.03 parts by weight of a deflocculant and 0.001 to 0.01 parts by weight of a surfactant; foaming the starting mixture at a pressure of 1 to 10 bar by compressed air at a temperature between ambient temperature and 95° C. to form a foam; molding and drying the foam to give a dried clay blank; and firing the dried clay blank at a product temperature between 600° and 1400° C.

2. The process according to claim 1, wherein the dried clay blank is fired at a product temperature between 800° to 1200° C.

3. The process according to claim 1, wherein the clay blank is dried at a temperature between ambient temperature and 200° C.

4. The process according to claim 1, wherein the dried clay blank is fired in less than 5 minutes at a kiln temperature of between 1000° and 1400° C., corresponding to a product temperature between 800° and 1000° C.

5. The process according to claim 1, further comprising adding a hydraulic binder to the clay mixture prior to the molding and drying step.

6. The process according to claim 5, wherein the hydraulic binder is cement.

7. The process according to claim 1, wherein the mixture has between 60 to 75 parts by weight of clay; 15 to 20 parts by weight of water; and 10 to 20 parts by weight of an aggregate.

8. The process according to claim 1, wherein the clay is selected from the group consisting of brick clay, Westerwald stoneware clay, fine stoneware clay, kaolin, montmorillonite, bentonite and marl.

9. The process according to claim 1, wherein the aggregate is selected from the group consisting of calcite, quartz sand, dolomite, feldspar, chamotte, sawdust and coal.

10. The process according to claim 1, further comprising adding a deflocculant-counteracting agent to the starting mixture or to the foam to produce a highly viscous, thixotropic, inherently stable foam.

11. The process according to claim 1, wherein the deflocculant-counteracting agent is dilute hydrochloric acid.

* * * * *

UNITED STATES PATENT AND TRADEMARK OFFICE
CERTIFICATE OF CORRECTION

PATENT NO.  : 4,824,811
DATED       : April 25, 1989
INVENTOR(S) : Rudiger Lang and Bernd Meyer It is certified that error appears in the above-identified patent and that said Letters Patent is hereby corrected as shown below:

In the Claims:

Claim 1, column 4, line 54, after "mixture" insert -- under pressure --.

Claim 11, column 6, line 11, after "claim" change "1" to -- 10 --.

Signed and Sealed this

Ninth Day of January, 1990

*Attest:*

JEFFREY M. SAMUELS

*Attesting Officer*    *Acting Commissioner of Patents and Trademarks*